United States Patent
Shi et al.

(10) Patent No.: US 12,182,546 B2
(45) Date of Patent: Dec. 31, 2024

(54) METHOD AND SYSTEM FOR MODEL PRODUCTION

(71) Applicant: BEIJING BAIDU NETCOM SCIENCE TECHNOLOGY CO., LTD., Beijing (CN)

(72) Inventors: En Shi, Beijing (CN); Yongkang Xie, Beijing (CN); Zihao Pan, Beijing (CN); Shupeng Li, Beijing (CN); Xiaoyu Chen, Beijing (CN); Zhengyu Qian, Beijing (CN); Jingqiu Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 130 days.

(21) Appl. No.: 17/820,095

(22) Filed: Aug. 16, 2022

(65) Prior Publication Data

US 2022/0391182 A1 Dec. 8, 2022

(30) Foreign Application Priority Data

Aug. 19, 2021 (CN) .......................... 202110955365.X

(51) Int. Cl.
*G06F 8/36* (2018.01)
*G06F 8/35* (2018.01)

(52) U.S. Cl.
CPC . *G06F 8/36* (2013.01); *G06F 8/35* (2013.01)

(58) Field of Classification Search
None
See application file for complete search history.

(56) References Cited

U.S. PATENT DOCUMENTS

| | | | | |
|---|---|---|---|---|
| 9,846,575 | B1 * | 12/2017 | Zander | G06F 8/61 |
| 11,817,214 | B1 * | 11/2023 | Sabes | G16B 40/30 |
| 2017/0011441 | A1 * | 1/2017 | Buezas | G06Q 30/0641 |

(Continued)

FOREIGN PATENT DOCUMENTS

| | | | | |
|---|---|---|---|---|
| CN | 111310934 A | * | 6/2020 | G06F 8/61 |
| CN | 111861020 A | * | 10/2020 | G06K 9/62 |

(Continued)

OTHER PUBLICATIONS

Azure, "Simplifying AI with the new automated machine learning UI", Microsoft Azure, 2019, Azure.microsoft.com (Year: 2019).*

(Continued)

*Primary Examiner* — Hossain M Morshed
(74) *Attorney, Agent, or Firm* — Osha Bergman Watanabe & Burton LLP

(57) ABSTRACT

A method for model production includes acquiring a related operation for model production from a user interface layer of a model production system, and determining a software platform of the model production system; acquiring a model service corresponding to the related operation by invoking an application programming interface (API) corresponding to the related operation, wherein the API is located between the user interface layer and other layer in the model production system; performing the model service by invoking local resources of the software platform with a tool of the software platform adapted to the model service, to generate a target model; and applying the target model in a target usage scene.

19 Claims, 3 Drawing Sheets

(56) References Cited

U.S. PATENT DOCUMENTS

| | | | | |
|---|---|---|---|---|
| 2017/0039049 | A1* | 2/2017 | Eltsin | G06F 21/53 |
| 2020/0167259 | A1* | 5/2020 | Cannata | G06F 11/3452 |
| 2020/0310852 | A1* | 10/2020 | Featonby | G06F 9/45558 |
| 2020/0319765 | A1* | 10/2020 | Badr | G08C 17/02 |
| 2020/0394566 | A1* | 12/2020 | Martín | G06N 20/20 |
| 2022/0318683 | A1* | 10/2022 | Sawaf | G06N 20/20 |
| 2022/0329555 | A1* | 10/2022 | Xu | H04L 12/1827 |
| 2022/0366131 | A1* | 11/2022 | Ekron | G06F 16/986 |
| 2022/0391182 | A1* | 12/2022 | Shi | G06F 8/36 |
| 2023/0031691 | A1* | 2/2023 | Carroll | G06N 3/045 |
| 2023/0036806 | A1* | 2/2023 | Moon | G06F 9/547 |
| 2023/0049160 | A1* | 2/2023 | McCormick | G06Q 10/06313 |
| 2024/0009555 | A1* | 1/2024 | Mehat | A63F 13/355 |

FOREIGN PATENT DOCUMENTS

| | | | |
|---|---|---|---|
| WO | 03036475 | A1 | 5/2003 |
| WO | 2014150045 | A1 | 9/2014 |

OTHER PUBLICATIONS

Souli, "Optimal operating system to support Machine Learning and Computer Vision?", Jun. 2021, Published at LinkedIn (Year: 2021).*
European Search Report issued in European Application No. 22190846.0, mailed on Jan. 19, 2023 (9 pages).
Office Action issued for corresponding Chinese patent application No. 202110955365.X, mailed on May 9, 2022 (22 pages).

* cited by examiner

METHOD AND SYSTEM FOR MODEL PRODUCTION

CROSS REFERENCE TO RELATED APPLICATIONS

This application claims priority to Chinese Patent Application No. 202110955365.X, filed on Aug. 19, 2021, the entire content of which is incorporated herein by reference.

TECHNICAL FIELD

The disclosure relates to a field of computer technologies, in particular to a field of Artificial intelligence technology, and particularly to a method for model production, a system for model production and an apparatus for model production, and an electronic device.

BACKGROUND

Artificial intelligence (AI) technology continuously promotes the development of industry intelligence. Finance, energy, industry, retail and other fields are constantly undergoing transformation from digitalization to intelligence. In this process, an AI model needs to be produced for a specific scene, to solve the problem in a specific scene, for example, defect detection, commodity detection.

SUMMARY

According to a first aspect of the disclosure, a method for model production includes: acquiring a related operation for model production from a user interface layer of a model production system, and determining a software platform of the model production system; acquiring a model service corresponding to the related operation by invoking an application programming interface (API) corresponding to the related operation, in which the API is located between the user interface layer and other layer in the model production system; performing the model service by invoking local resources of the software platform with a tool of the software platform adapted to the model service, to generate a target model; and applying the target model in a target usage scene.

According to a second aspect of the disclosure, a system for model production includes: a user interface layer built based on a cross-platform framework, configured to acquire a related operation for model production and invoke an application programming interface (API) corresponding to the related operation; an API layer connected to the user interface layer and a stand-alone engine layer, configured to acquire a target model service corresponding to the related operation based on invoking the API by the user interface layer; and a stand-alone engine layer configured with model services, each of the model services is adapted to a tool of at least one software platform, the stand-alone engine layer is configured to perform the target model service corresponding to the related operation on a software platform based on local resources of the software platform invoked by the tool of the software platform.

According to a third aspect of the disclosure, a non-transitory computer readable storage medium stored with computer instructions is provided. When the computer instructions are executed by a computer, the computer is caused to perform a method for model production. The method includes: acquiring a related operation for model production from a user interface layer of a model production system, and determining a software platform of the model production system; acquiring a model service corresponding to the related operation by invoking an application programming interface (API) corresponding to the related operation, in which the API is located between the user interface layer and other layer in the model production system; performing the model service by invoking local resources of the software platform with a tool of the software platform adapted to the model service, to generate a target model; and applying the target model in a target usage scene.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

Figure 1:
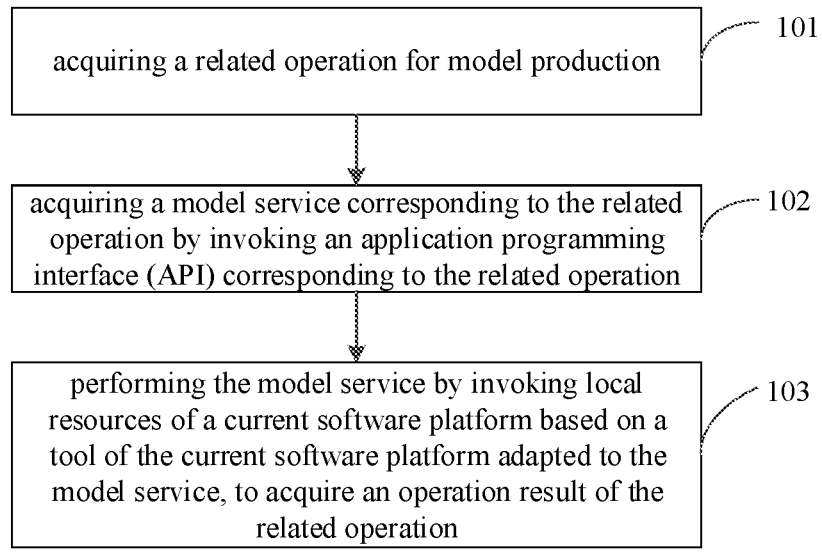
FIG. 1 is a diagram according to a first embodiment of the disclosure.

Embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope of the present disclosure. Similarly, for clarity and conciseness, descriptions of well-known functions and structures are omitted in the following descriptions.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

AI technology continuously promotes the development of industry intelligence. Finance, energy, industry, retail, and other fields are constantly undergoing transformation from digitalization to intelligence. In this process, a AI model needs to be produced for a specific scene, to solve the problem in a specific scene, for example, defect detection, commodity detection. However, production of the AI model is a very complex system engineering, and various aspects such as data, modeling and deployment need to be considered. The occurrence of various platforms for AI production greatly reduces the cost of producing an AI model, so that a developer only needs to pay attention to the demands and the model itself, and production and optimization of a model may be completed through simple steps.

In the related art, there are mainly three manners for an AI model production platform. In a first manner where a cloud platform is adopted, the developer needs to upload training data to the cloud platform, so that modeling and configuration are performed through the cloud platform; and when a model training process on the cloud platform is completed, it is finally applied by deploying a cloud service or downloading a software development kit (hereinafter referred to as SDK) of a model. In a second manner, a desktop software of a single platform is provided in combination with its own ecology, such as CreateML of the Apple Company (a tool for machine learning model generation), which may be running on an operating system MacOS 10.14 version; modeling and training are completed locally, and model training is performed by using a computing power of the Apple computer or an external graphics processing unit (GPU). In a third manner where cluster deployment is privatized, a development platform (including data service, model training, prediction service, etc.) is deployed in a private cloud or a computer room of an Internet data center (IDC) for internal use by an enterprise, where the IDC is owned by the enterprise.

However, even though the first manner may provide a complete model production service through a cloud service, problems such as data privacy and network dependence may exist. First, many customer data for model production is relatively private, although some data isolation and privacy protection mechanisms have been made for the cloud platform, there is a certain hidden danger for extremely sensitive data, and some enterprise data do not be allowed to leave the internal environment of the enterprise. Second, the cloud service needs to ensure the stability of the network, and cannot be used in certain network-free environments. Although the second manner may solve the problem of partial data privacy and network dependence, two disadvantages mainly exist: firstly, there is no universality and expandability, only a single platform is supported, and a corresponding hardware must be purchased before use; and secondly, the supported data and the deployed service are not complete, and it is difficult to apply the trained model in practical use. The third manner is very high in cost. A private cloud of a certain scale or an IDC room is needed, and the development platform needs to be docked with a data warehouse, a data platform, a management system and the like existed in the enterprise, and a large amount of privatized and customized transformation needs to be made, and the overall construction period is very long. In addition, due to a completely private deployment and a relatively large system, the latest algorithm, function, mechanism and the like may not be updated in time.

For the above problems, a method, a system and an apparatus for model production, and an electronic device are provided in the disclosure.

FIG. 1 is a diagram according to a first embodiment of the disclosure. It should be noted that, the method for model production in the embodiment of the disclosure may be applied to an apparatus for model production in the embodiment of the disclosure, and the apparatus may be configured in an electronic device.

As illustrated in FIG. 1, the method for model production may include the following steps at 101-103.

At 101, a related operation for model production is acquired.

In the embodiment of the disclosure, a system for model production may be a desktop system of a computer (for example, a personal computer), and may be constructed based on an Electron (which is an open source cross-platform development tool for a desktop application) framework, with a cross-platform property. The system for model production may support mainstream operating systems such as Windows, Linux, MacOS. The system for model production may include a user interface layer, an API layer, a stand-alone engine layer and a management service layer.

Alternatively, a user may interact with the system for model production through a user interface layer, for example, the user may operate the system for model production through the user interface layer, and an apparatus for model production may determine whether the user operation belongs to the related operation for model production. In order to make the system for model production provide various functions, the related operation includes at least one of: a data processing operation, a model training operation, a model optimization operation, and a model deployment operation for model production.

The data processing operation for model production may include importing, annotation, cleaning, quality inspection, and exporting of data. The model training operation may be applied to zero code modeling, development of a preset model and Notebook modeling and the like. The zero code modeling needs a simple task configuration without writing a code to train a model. The development of the preset model refers that simple modification and parameter adjustment may be performed based on the preset model provided by the system to complete model training. The notebook modeling may autonomously perform network development and modeling. The model optimization operation may include: model accuracy optimization and model performance optimization, in which the model accuracy optimization may give a model accuracy optimization suggestion through an intelligent evaluation report. In addition, the model performance optimization may improve the model performance and reduce the volume on the premise of keeping original effects as much as possible by selecting quantization, clipping, distillation and the like. The model deployment operation may be configured for deploying the trained model as a local API service, or producing and integrating a corresponding SDK in a specific production environment. At the same time, direct export of the trained model is also supported, so as to flexibly perform secondary training and deployment in a network-free environment.

In addition, the apparatus for model production may further determine a current software platform of the system for model production, for example, the apparatus for model production may determine an operating system corresponding to the device based on hardware performance of a device where the system for model production is located, and determine the device corresponding to the operating system as a current software platform of the system for model production. It needs to be noted that, since the hardware performances of the devices are different, and the corresponding operating systems are different, the devices are different software platforms.

At 102, a model service corresponding to the related operation is acquired by invoking an application programming interface (API) corresponding to the related operation.

Further, the apparatus for model production may acquire the model service corresponding to the related operation by invoking the application programming interface (API) corresponding to the related operation based on the related operation for model production. In order to acquire rich model services, the model services include at least one of: a storage access service, a task scheduling service, a resource allocation service, a service deployment service, a preset algorithm, a pre-training model, and a model framework.

At 103, an operation result of the related operation is acquired by invoking local resources of a current software platform to perform the model service based on a tool of the current software platform adapted to the model service.

In order to make the model service be adapted to the hardware performance of the current software platform, in the embodiment of the disclosure, the operation result of the related operation is acquired by invoking local resources (such as computing power resources and/or storage resources) of the current software platform to perform the model service based on a tool of the current software platform adapted to the model service. It needs to be noted that, the tool of the current software platform may include at least one of: an instruction set, an instruction library and a software development kit. In an embodiment, the operation result may include a model to be produced, and the user may apply the generated model in a specific scene where a specific problem needs to solve, such as a defect detection scene, a commodity detection scene, etc., which is not limited in the disclosure.

The apparatus for model production may adapt the mainstream operating system and the corresponding computing power resources to the model services. For example, on a central processing unit (CPU) adapted with model services, the model services may be performed based on some instruction sets or instruction libraries provided by the CPU. The model services may be performed by directly invoking computing power of the CPU in response to no instruction set or instruction library adapted to the model services.

In summary, the related operation for model production is acquired; the model service corresponding to the related operation is acquired by invoking the API corresponding to the related operation; and the operation result of the related operation is acquired by invoking local resources of the current software platform to perform the model service based on a tool of the current software platform adapted to the model service. The method adapts a tool required for performing the service on different platforms to the model service, and performs the model service by invoking local resources on the current software platform with the tool, so that the model production software may be adapted to different operating systems, with a relatively good universality and expansibility.

Figure 2:
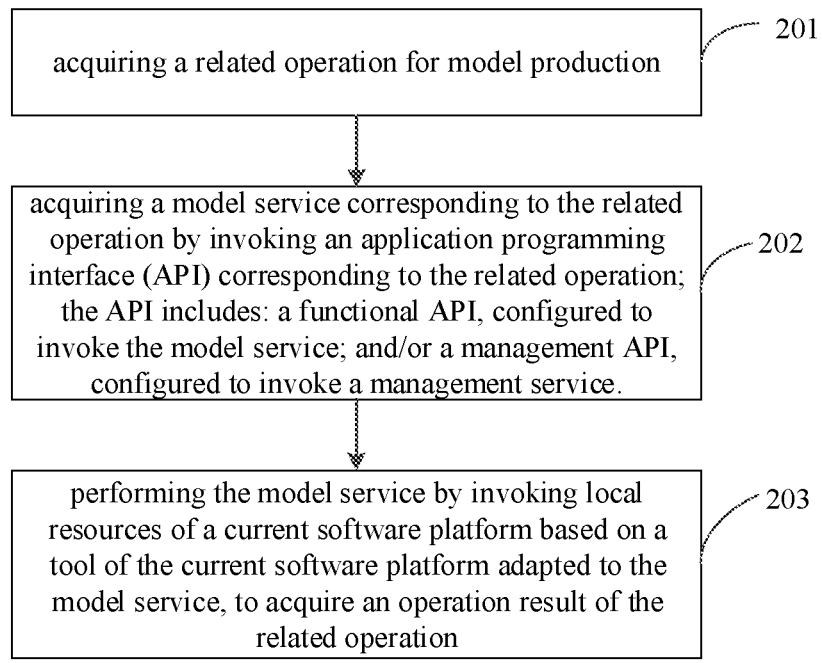
FIG. 2 is a diagram according to a second embodiment of the disclosure.

In order to acquire the model service corresponding to the related operation more accurately, as illustrated in FIG. 2, FIG. 2 is a diagram according to a second embodiment of the disclosure. In the embodiment of the disclosure, different types of model services may be invoked by different APIs. The embodiment of the disclosure as illustrated in FIG. 2 may include the following steps at 201-203.

At 201, a related operation for model production is acquired.

At 202, a model service corresponding to the related operation is acquired by invoking an application programming interface (API) corresponding to the related operation. The API includes: a functional API, configured to invoke the model service; and/or a management API, configured to invoke a management service.

It needs to be understood that, the API is an interface between a user interface layer in a model production system and other layers (for example, a stand-alone engine layer and a management service layer) in the model production system. Since different layers in the model production system have different requirements for security, performance and time delay, the API is implemented by a local remote procedure call (RPC) service, a hyper-text transfer protocol (HTTP) service, inter-process communication, a dynamic link library, etc.

In the embodiment of the disclosure, the API is mainly divided into two categories. The first category is a functional API configured to invoke the model services in the stand-alone engine layer, including a storage access service, a task scheduling service, a resource allocation service, a service deployment service, a preset algorithm, a pre-training model, and a model framework. The storage access service may be configured to access a desktop local document system and a local database through an operating system, so as to satisfy storage and access demands of data, document, model and metadata. The service scheduling service may be pipeline scheduling, state management and life cycle management for completing data, training, evaluation and other types of tasks. The resource allocation service may complete access of local computing power resources (including local CPU/GPU and external computing power) by docking with operating systems. The service deployment service may support deploying a trained model as a local API service and provide functions such as deployment, monitoring and log storage. The preset algorithm and the pre-training model may support modeling manners such as zero-code modeling and parameter adjustment of the preset model. The model framework may integrate some common open-source frameworks for deep learning and machine learning, for example, a PaddlePaddle, an open-source computer programming language machine learning library (Pytorch), a second machine learning framework (Tensorflow) of Google, a machine learning library (SKLearn) and an open-source machine learning library (XGBoost), etc.

The second category is a management API. In order to further acquire rich model services, the management API may be further provided to invoke management services in the management services layer of the model production system, which may include a security encryption service, an authorization management service and a download update service. The security encryption service may provide encryption services for core resources of a software, including a core code, a preset model, etc. The authorization management service may provide a permission-authorization management mechanism based on time, to protect software intellectual property and satisfy commercial billing requirements.

At 203, an operation result of the related operation is acquired by invoking local resources of a current software platform to perform the model service based on a tool of the current software platform adapted to the model service.

In the embodiment of the disclosure, blocks 201 and 203 may be achieved by any of embodiments in the disclosure, which will not be limited nor repeated here.

In summary, the model service corresponding to the related operation is acquired by invoking the API corresponding to the related operation. The API includes: the functional API, configured to invoke the model service; and/or the management API, configured to invoke the management service. Therefore, the model service corresponding to the related operation may be accurately acquired by invoking different APIs based on different types of model services.

In the method for model production in the embodiment of the disclosure, the related operation for model production is acquired; the model service corresponding to the related operation is acquired by invoking the API corresponding to the related operation; and the operation result of the related operation is acquired by invoking local resources of the current software platform to perform the model services based on the tool of the current software platform adapted to the model services. The method adapts a tool required for performing the service on different platforms to the model service, and performs the model service by invoking local resources on the current software platform with the tool, so that the system for model production may be adapted to different operating systems, with a relatively good universality and expansibility, and a native experience and increment update of the system for model production may be ensured for different operating systems.

In order to achieve the above embodiment, a system for model production is further provided in the embodiment of the disclosure.

Figure 3:
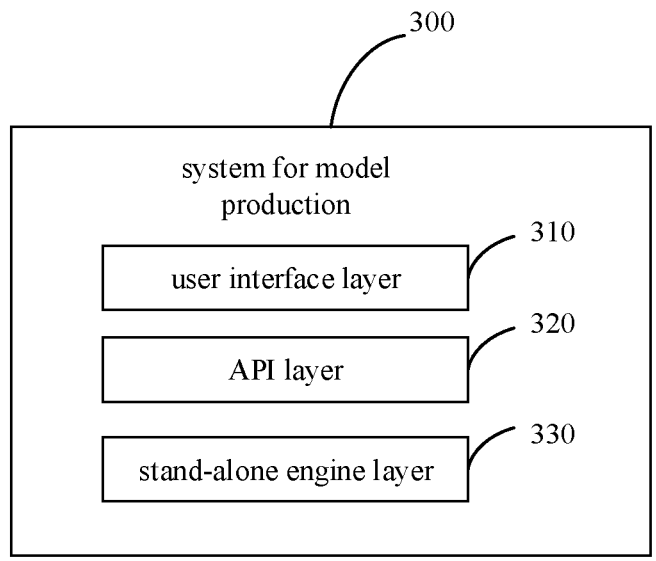
FIG. 3 is a diagram according to a third embodiment of the disclosure.

FIG. 3 is a diagram according to a third embodiment of the disclosure. As illustrated in FIG. 3, the system 300 for model production may include a user interface layer 310, an API layer 320 and a stand-alone engine layer 330.

The user interface layer 310 may be constructed based on a cross-platform framework. For example, a software user interface layer may be constructed based on an Electron framework. Alternatively, a user may generate the related operation for model production through an operation to a functional control on a user interface layer 310, so that the user interface layer 310 may acquire the related operation for model production, and invoke an API corresponding to the related operation for model production. In order to acquire the related operation, the user interface layer 310 may be configured with at least one of: a data processing control, a model training control, a model optimization control and a model deployment control.

The API layer 320 respectively connected to the user interface layer 310 and the stand-alone engine layer 330 may be configured to acquire a model service corresponding to the related operation based on the invoking of the API by the user interface layer. The API layer may include a functional API, configured to invoke the model service; and/or a management API, configured to invoke a management service. The model service includes at least one of: a storage access service, a task scheduling service, a resource allocation service, a service deployment service, a preset algorithm, a pre-training model, and a model framework. The management service may include at least one of: a security encryption service, an authorization management service and a download update service.

The stand-alone engine layer 330 is configured with model services, each of the model services is adapted to a tool of at least one software platform, the stand-alone engine layer is configured to perform the model service corresponding to the related operation on a current software platform based on local resources of the current software platform invoked by the tool of the current software platform. The tool includes at least one of: an instruction set, an instruction library and a software development kit.

As a possible implementation of the embodiment of the disclosure, the system 300 for model production further includes a management service layer. The management service layer is configured to provide at least one management service. The management service includes at least one of: a security encryption service, an authorization management service and a download update service.

In order to illustrate the above embodiment better, it may be illustrated by taking an example.

Figure 4:
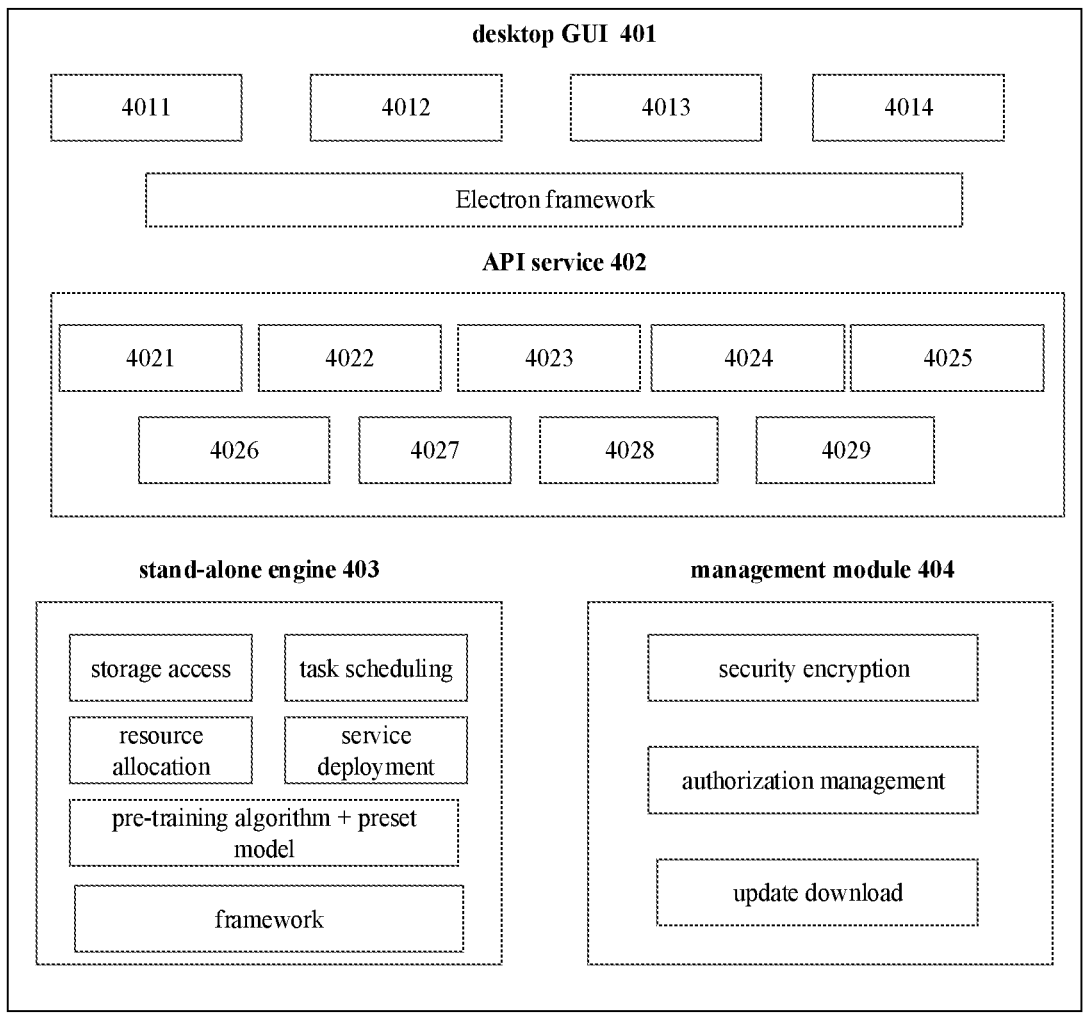
FIG. 4 is a structural diagram of a desktop software for AI model production according to the embodiment of the disclosure.

For example, as illustrated in FIG. 4, the system for model production takes a desktop software 400 for AI model production for an example. The desktop software 400 for AI model production includes a desktop GUI 401, an API service 402, a stand-alone engine 403, and a management module 404. The desktop GUI may be constructed based on the Electron framework, with a cross-platform property, and may support mainstream operating systems such as Windows, Linux, MacOS. The desktop GUI 401 is configured with a data service control 4011, a model training control 4012, a model optimization control 4013 and a model deployment control 4014. The user may perform operations on the above controls 4011-4014 through the desktop GUI, for example, a data service operation, a model training operation, a model optimization operation, and a model deployment operation. The API service 402 is an interface layer between the desktop GUI 401 and the backend module (not shown), which may not be viewed by a software user. Since different functional modules have different requirements for security, performance and time delay, the API may be implemented by: a local RPC service, a local HTTP service, inter-process communication and a dynamic link library. The API service mainly includes two categories. The first one is a functional API service that provides functions required for each aspect in modeling, including a data management API 4021, a task management API 4022, a code management API 4023, an evaluation and analysis API 4024, a deployment management API 4025, etc. Correspondingly, services are provided by a stand-alone engine 403. The second one is a management API service including an authentication API 4026, an update API 4027, a log monitoring API 4028, and a billing API 4029. Correspondingly, services are provided by the management module 404. The stand-alone engine is a core backend module of the entire desktop software that provides core services for AI model production, which mainly include: a framework, a pre-training algorithm and a preset model, storage access, task scheduling, resource allocation, service deployment, etc. The management module provides universal management functions, including security encryption, authorization management and update download in addition to the core functions.

The terms "module," "sub-module," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another. A unit or module may be implemented purely by software, purely by hardware, or by a combination of hardware and software. In a pure software implementation, for example, the unit or module may include functionally related code blocks or software components, which are directly or indirectly linked together, so as to perform a particular function.

The system for model production in the embodiment of the disclosure includes: a user interface layer built based on a cross-platform framework, configured to acquire the related operation for model production and invoke the API corresponding to the related operation; an API layer respectively connected to the user interface layer and a stand-alone engine layer, configured to acquire the model service corresponding to the related operation based on invoking the API by the user interface layer; and the stand-alone engine layer configured with model services, each of the model services is adapted to a tool of at least one software platform, the stand-alone engine layer is configured to perform the model service corresponding to the related operation on the current software platform based on local resources of the current software platform invoked by the tool of the current software platform. Therefore, a tool required for performing the service on different platforms is adapted to the model service, and the model service is performed by invoking local resources on the current software platform, so that the system for model production may be adapted to different operating systems, with a relatively good universality and expansibility.

In order to achieve the above embodiment, an apparatus for model production is further provided in the embodiment of the disclosure.

Figure 5:
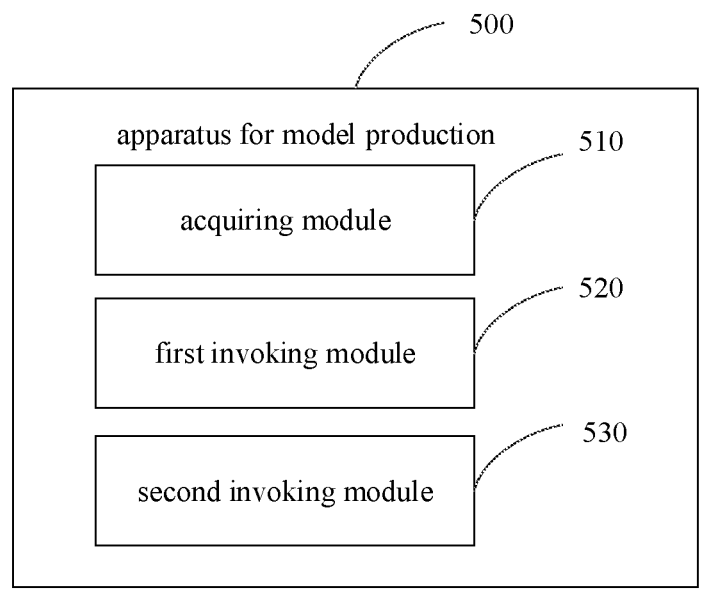
FIG. 5 is a diagram according to a fourth embodiment of the disclosure.

FIG. 5 is a diagram according to a fourth embodiment of the disclosure; as illustrated in FIG. 5, the apparatus 500 for model production includes an acquiring module 510, a first invoking module 520 and a second invoking module 530.

The acquiring module 510 is configured to acquire a related operation for model production; the first invoking module 520 is configured to acquire a model service corresponding to the related operation by invoking an application programming interface (API) corresponding to the related operation; and the second invoking module 530 is configured to acquire an operation result of the related operation by invoking local resources of a current software platform to perform the model service based on a tool of the current software platform adapted to the model service.

As a possible implementation of the embodiment of the disclosure, the related operation includes at least one of: a data processing operation, a model training operation, a model optimization operation, and a model deployment operation for model production.

As a possible implementation of the embodiment of the disclosure, the API includes: a functional API, configured to invoke the model service; and/or a management API, configured to invoke a management service.

As a possible implementation of the embodiment of the disclosure, the model service includes at least one of: a storage access service, a task scheduling service, a resource allocation service, a service deployment service, a preset algorithm, a pre-training model, and a model framework.

As a possible implementation of the embodiment of the disclosure, the tool includes at least one of: an instruction set, an instruction library and a software development kit.

As a possible implementation of the embodiment of the disclosure, the management service includes at least one of: a security encryption service, an authorization management service and a download update service.

In the apparatus for model production in the embodiment of the disclosure, the related operation for model production is acquired; the model service corresponding to the related operation is acquired by invoking the API corresponding to the related operation; and the operation result of the related operation is acquired by invoking local resources of the current software platform to perform the model service based on the tool of the current software platform adapted to the model service. The apparatus may adapt a tool required for performing the service on different platforms to the model service, and perform the model service by invoking local resources on the current software platform with the tool, so that the system for model production may be adapted to different operating systems, with a relatively good universality and expansibility.

The acquisition, storage, and application of the user personal information involved in the technical solution of the disclosure comply with relevant laws and regulations, and do not violate public order and good customs.

According to the embodiment of the disclosure, an electronic device, a readable storage medium and a computer program product are further provided in the disclosure.

Figure 6:
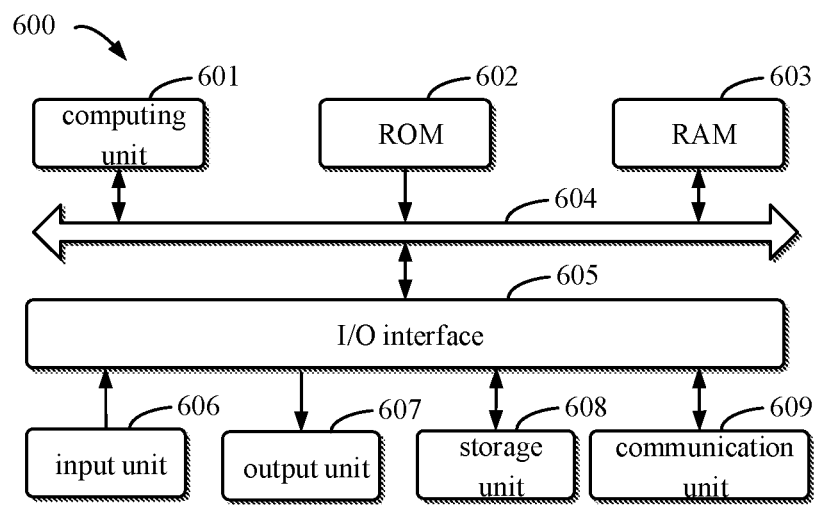
FIG. 6 is a block diagram of an electronic device configured to implement a method for model production in the embodiment of the disclosure.

FIG. 6 illustrates a schematic block diagram of an example electronic device 600 configured to implement the embodiment of the disclosure. The electronic device is intended to represent various types of digital computers, such as laptop computers, desktop computers, workstations, personal digital assistants, servers, blade servers, mainframe computers, and other suitable computers. The electronic device may also represent various types of mobile devices, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 6, a device 600 includes a computing unit 601, configured to execute various appropriate actions and processes according to a computer program stored in a read-only memory (ROM) 602 or loaded from a memory unit 608 to a random access memory (RAM) 603. In the RAM 603, various programs and data required for the device 600 may be stored. The computing unit 601, the ROM 602 and the RAM 603 may be connected with each other by the bus 604. The input/output (I/O) interface 605 is also connected to the bus 604.

A plurality of components in the device 600 are connected to the I/O interface 605, and includes: an input unit 606, for example, a keyboard, a mouse, etc.; an output unit 607, for example various types of displays, speakers; the memory unit 608, for example a magnetic disk, an optical disk; and a communication unit 609, for example, a network card, a modem, a wireless transceiver. The communication unit 609 allows the device 600 to exchange information/data through a computer network such as internet and/or various types of telecommunication networks and other devices.

The computing unit 601 may be various types of general and/or dedicated processing components with processing and computing ability. Some examples of the computing unit 601 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 601 performs various methods and processes as described above, for example, a method for model production. For example, in some embodiments, the method for model production may be further achieved as a computer software program, which is physically contained in a machine readable medium, such as the storage unit 608. In some embodiments, a part or all of the computer program may be loaded and/or installed on the device 600 via the ROM 602 and/or the communication unit 609. When the computer program is loaded on the RAM 603 and executed by the computing unit 601, one or more blocks in the method for model production as described above may be performed. Alternatively, in other embodiments, the computing unit 601 may be configured to perform a method for model production in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer codes configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. The computer codes may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. The machine readable medium may be a machine readable signal medium or a machine readable storage medium. The machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display device for displaying information to the user (for example, a CRT (cathode ray tube) or a LCD (liquid crystal display) monitor); and a keyboard and a pointing device (for example, a mouse or a trackball) through which the user may provide input to the computer. Other types of devices may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system (for example, as a data server) including back-end components, or a computing system (for example, an application server) including middleware components, or a computing system (for example, a user computer with a graphical user interface or a web browser through which the user may interact with the implementation mode of the system and technology described herein) including front-end components, or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and the Internet.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, and further may be a server of a distributed system, or a server in combination with a blockchain.

It should be understood that, various forms of procedures shown above may be configured to reorder, add or delete blocks. For example, steps described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

The invention claimed is:

1. A computer-implemented method for model production, comprising:
   acquiring a related operation for model production from a user interface layer of a model production system, and determining a software platform of the model production system;
   acquiring a model service corresponding to the related operation by invoking an application programming interface (API) corresponding to the related operation, wherein the API is located between the user interface layer and other layer in the model production system;
   performing the model service by invoking local resources of the software platform with a tool of the software platform adapted to the model service, to generate a target model; and
   applying the target model in a target usage scene;
   wherein the model service is adapted to at least one software platform, the software platform has a tool required for performing the model service, a current software platform is a device corresponding to a current operating system, and the current operating system is determined based on hardware performance of a device where the model production system is currently located.

2. The method of claim 1, wherein, the related operation comprises at least one of: a data processing operation, a model training operation, a model optimization operation, and a model deployment operation for model production.

3. The method of claim 1, wherein, the API comprises at least one of:
   a functional API, invoking the model service; and
   a management API, invoking a management service.

4. The method of claim 1, wherein, the model service comprises at least one of: a storage access service, a task scheduling service, a resource allocation service, a service deployment service, a preset algorithm, a pre-training model, and a model framework.

5. The method of claim 1, wherein, the tool comprises at least one of: an instruction set, an instruction library and a software development kit.

6. The method of claim 3, wherein, the management service comprises at least one of: a security encryption service, an authorization management service and a download update service.

7. A system for model production, comprising:
a user interface layer built based on a cross-platform framework, wherein a related operation for model production is acquired and an application programming interface (API) corresponding to the related operation is invoked;
an API layer connected to the user interface layer and a stand-alone engine layer, wherein a target model service corresponding to the related operation is acquired based on invoking the API by the user interface layer; and
the stand-alone engine layer configured with model services, wherein each of the model services is adapted to a tool of at least one software platform, in the stand-alone engine layer, the target model service corresponding to the related operation is performed on a target software platform based on local resources of the target software platform invoked by the tool of the target software platform;
wherein the model service is adapted to at least one software platform, the software platform has a tool required for performing the model service, a current software platform is a device corresponding to a current operating system, and the current operating system is determined based on hardware performance of a device where the model production system is currently located.

8. The system of claim 7, wherein, the user interface layer is configured with at least one of: a data processing control, a model training control, a model optimization control and a model deployment control.

9. The system of claim 7, wherein, the API layer comprises at least one of:
a functional API, invoking the model service; and
a management API, invoking a management service.

10. The system of claim 7, wherein, the tool comprises at least one of: an instruction set, an instruction library and a software development kit.

11. The system of claim 7, wherein, the model service comprises at least one of: a storage access service, a task scheduling service, a resource allocation service, a service deployment service, a preset algorithm, a pre-training model, and a model framework.

12. The system of claim 7, further comprising:
a management service layer, wherein at least one management service is provided.

13. The system of claim 12, wherein, the management service comprises at least one of: a security encryption service, an authorization management service and a download update service.

14. A non-transitory computer readable storage medium stored with computer instructions, wherein, when the computer instructions are executed by a computer, the computer is caused to perform a method for model production, the method comprising:
acquiring a related operation for model production from a user interface layer of a model production system, and determining a software platform of the model production system;
acquiring a model service corresponding to the related operation by invoking an application programming interface (API) corresponding to the related operation, wherein the API is located between the user interface layer and other layer in the model production system;
performing the model service by invoking local resources of the software platform with a tool of the software platform adapted to the model service, to generate a target model; and
applying the target model in a target usage scene;
wherein the model service is adapted to at least one software platform, the software platform has a tool required for performing the model service, a current software platform is a device corresponding to a current operating system, and the current operating system is determined based on hardware performance of a device where the model production system is currently located.

15. The storage medium of claim 14, wherein, the related operation comprises at least one of: a data processing operation, a model training operation, a model optimization operation, and a model deployment operation for model production.

16. The storage medium of claim 14, wherein, the API comprises at least one of:
a functional API, invoking the model service; and
a management API, invoking a management service.

17. The storage medium of claim 14, wherein, the model service comprises at least one of: a storage access service, a task scheduling service, a resource allocation service, a service deployment service, a preset algorithm, a pre-training model, and a model framework.

18. The storage medium of claim 14, wherein, the tool comprises at least one of: an instruction set, an instruction library and a software development kit.

19. The storage medium of claim 16, wherein, the management service comprises at least one of: a security encryption service, an authorization management service and a download update service.

* * * * *